(12) United States Patent
Deng et al.

(10) Patent No.: US 9,774,065 B2
(45) Date of Patent: Sep. 26, 2017

(54) LIQUID-COOLED BATTERY PACK SYSTEM

(71) Applicant: Microvast Power Systems Co.,Ltd., Huzhou, Zhejiang Province (CN)

(72) Inventors: Guoyou Deng, Huzhou (CN); Yang Wu, Huzhou (CN); Feng Guo, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 0 days.

(21) Appl. No.: 14/601,159

(22) Filed: Jan. 20, 2015

(65) Prior Publication Data
US 2017/0162923 A1    Jun. 8, 2017

(30) Foreign Application Priority Data
Jan. 21, 2014    (CN) .......................... 2014 1 0026556

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/484* (2013.01); *H01M 10/486* (2013.01);
(Continued)

(58) Field of Classification Search
CPC .......... H01M 10/6568; H01M 10/613; H01M 10/6557; H01M 10/484; H01M 10/486;
(Continued)

(56) References Cited

U.S. PATENT DOCUMENTS 6,159,631 A * 12/2000 Thompson .......... H01M 2/0225
                                                         220/203.08
7,507,500 B2 * 3/2009 Donnelly .............. B60L 3/0046
                                                         429/120
(Continued)

FOREIGN PATENT DOCUMENTS

CN    101542806 A    9/2009
CN    101800329 A    8/2010
(Continued)

*Primary Examiner* — Gregg Cantelmo
(74) *Attorney, Agent, or Firm* — Cheng-Ju Chiang

(57) ABSTRACT

The present invention provides a battery module and a liquid-cooled battery system that uses it, a battery cell and a current collector sheet, on the premise that the materials like the electrode and separator and so on are completely the same, energy density of the battery pack is greatly increased; the cell and the current collector sheet are fully welded connections, the joints are fewer and it is not prone to produce desoldering, also ensuring the stability of the of the cell tab and high current carrying capacity, and when putting the parallel battery module in series, the use of wires are avoided, thus reduces the volume of the battery pack; the innovative design for the liquid-cooled battery pack system, improves the thermal balance between the cells, and the heat-dissipation in battery pack distributes more evenly, the insulation property of the battery package is highly improved, controlling the heat-dissipation capacity of the system by adjusting the flow rate of the circulating pump, not only the unnecessary energy consumption can be avoided, but also have a better impact resistance.

24 Claims, 7 Drawing Sheets

(51) Int. Cl.
*H01M 10/6557* (2014.01)
*H01M 10/625* (2014.01)
*H01M 10/48* (2006.01)
*H01M 10/054* (2010.01)

(52) U.S. Cl.
CPC ..... *H01M 10/613* (2015.04); *H01M 10/6557* (2015.04); *H01M 10/054* (2013.01); *H01M 10/625* (2015.04); *H01M 2220/20* (2013.01)

(58) Field of Classification Search
CPC ............. H01M 10/625; H01M 10/054; H01M 2220/20
See application file for complete search history.

(56) References Cited

U.S. PATENT DOCUMENTS

| | | | | |
|---|---|---|---|---|
| 2006/0093899 A1* | 5/2006 | Jeon | ................... | H01M 2/1072 429/99 |
| 2010/0266878 A1* | 10/2010 | Eilertsen | .............. | H01G 9/0003 429/53 |
| 2010/0273034 A1* | 10/2010 | Hermann | ................ | H01M 2/08 429/62 |
| 2011/0177383 A1* | 7/2011 | Culver | .................... | H01M 2/14 429/160 |
| 2011/0293982 A1* | 12/2011 | Martz | ................. | H01M 10/613 429/120 |
| 2011/0298472 A1* | 12/2011 | Carkner | ............. | H01M 10/486 324/538 |
| 2013/0183552 A1* | 7/2013 | Yang | ................... | H01M 2/1077 429/51 |

FOREIGN PATENT DOCUMENTS

| | | |
|---|---|---|
| CN | 102544402 A | 7/2012 |
| CN | 202871893 U | 4/2013 |
| CN | 202888250 U | 4/2013 |
| CN | 103208656 | 7/2013 |
| CN | 203760591 U | 8/2014 |

\* cited by examiner

LIQUID-COOLED BATTERY PACK SYSTEM

CROSS-REFERENCE TO RELATED APPLICATIONS

The present invention claims benefit from China Patent Application, which bears a serial No. CN201410026556.8 and filed on Jan. 21, 2014 and contents of which are hereby incorporated herein by reference.

FIELD OF THE INVENTION

This invention relates to a battery module, more specifically relates to a soft-package battery module and a liquid-cooled battery pack system comprising this battery module.

BACKGROUND OF THE INVENTION

Lithium-ion battery is a green battery with high energy density, high average output voltage, low self-discharge, no memory effect, wide operating temperature range (is −20° C.~60° C.), excellent cycling performance, high charge-discharge efficiency, long calendar life and that contains non-toxic and hazardous substances. It relies on the lithium-ions' round-trip of embedding and de-embedding between a negative electrode and a positive electrode to complete battery charging and discharging operations.

While electric vehicles have many advantages comparing to conventional cars, but there still are many problems when the lithium-ion battery packs are applied to the electric cars, the most to be resolved is the group technology of the lithium-ion battery, which involves the following key problems: 1. improving the energy density of the battery pack, 2. keeping the battery pack operating with an appropriate temperature range, 3. ensuring the safety performance of the battery pack.

Energy density of the lithium-ion battery pack is mainly determined by the framework of the battery pack, usually the lithium-ion battery cells are assembled in parallel first, then the parallel modules are assembled in series, and the connections of tabs require the use of the current collector sheets. In the prior art, parallel connections of the cells are the taps of the battery cells directly welded on the current collector sheets, while series connection of the cells is using wires to connect the current collector sheets. However, the battery module has the following disadvantages: 1. When the battery is in the process of operation, it is easy to lose the welding point between the wires and the current collector sheet while shocking, thereby resulting in pseudo soldering and de-soldering; 2. for there are other wires for sampling such as sampling lines exist, then the adding of the wires, makes the internal battery more messy, and takes up too much space.

Patent with application No. CN201010142205.5, titled "battery pack" discloses a battery pack composed of a plurality of soft-package battery cells, which includes connecting means that collect the two batteries, the batteries and the connecting means are collected together by wires, thus the space of the battery pack is occupied greatly or takes a big or extensive real estate, the energy density is reduced, and the welding between the wires and the connecting means is spot welding, it becomes loose by shocking in the operation process, and thus results in pseudo soldering and de-soldering.

Again, among the products the Tesla company put on the market, the battery module of the product with maximum energy density used by the ModelS has the size of length 2.7 m, width 1.5 m, thickness 0.1 m to 0.18 m, is composed of 7600 batteries of 18650, for a 18650 battery cell, the battery shell is approximately 0.02 dm, the electrode sheet's length is 0.65-0.05 after removing the top and bottom members of the battery, therefore the volume of the electrode sheets of the 18650 battery cell is $3.14*((0.18-0.004)/2)^2*(0.6)=0.0146$ liters, the volume of the electrode sheets used in the batteries of the entire car is $0.0146*7600=111$ liters, the volume of the battery module is $27*15*1+3*15*0.8=441$ L. In summary, the volume ratio that the electrode sheets occupied the battery pack (Electrode Volume Ratio hereinafter is abbreviated as EVR) is $111/441=25.2\%$, under the same conditions that the other materials are the same, the higher proportion the electrode sheets take, the higher energy density of the battery pack is, the lower the contrary, 25.2% of EVR for the electric cars has greater constraints to the improvement of the volume energy density, it is not conducive for the arrangement of the power battery to make the mileage of power battery electric vehicles with the indicators of the traditional car in order to meet the needs of customers (the single fuel mileage of the traditional car is almost 600 kilometers, while longest mileage of Tesla is only about 400 kilometers on single charge).

Moreover the battery pack uses cylindrical battery cells, the cylindrical battery cells can be welded to the connecting pieces only by spot welding, and because the contact area is small between the poles of the battery cell and the connecting pieces, so this reduces the current through capacity, also increases the heat, and combining such number of cylindrical battery cells into the battery pack, the heat generated will be very great, the design for heat-dissipation will be more complicated, also more energy will be wasted, these further reduce the effective use of the energy in the overall lithium-ion battery pack.

Lithium-ion battery pack generates heat during charging and discharging process, particularly in fast charging or over-discharging process more serious, if the heat is out of control, the consequences is very serious, decomposition of the electrolyte will occur due to the high temperature, the gases produced will fulfill the cell immediately, the cell will burst when the internal pressure of the cell is too high, at last explosion occurred when it contacts the oxygen in the air. At present, the heat-dissipation and cooling methods for lithium-ion battery pack are mainly air-cooled and liquid-cooled.

Air-cooling method is that through the cold wind poured from the outside into the devices or the fans convection cools the lithium-ion battery pack system. However, since the battery pack is mounted to a group by series and parallel connection, the interval between the battery is small, the battery in the center will have high temperature due to ventilation difficulties, strong wind cools uneven, which causes the decrease in the consistency of the battery, affects the battery life. If for improving the air cooling effect, increasing the flow passage of the cooling air, it will result in a lot of the waste in volume space, and will reduce the volume energy density of the battery pack system. So during the usage of lithium-ion batteries of electric vehicles, the air cooling cannot achieve good cooling effects.

Liquid cooling makes use of the high thermal conductivity of the liquid to take away the heat generated in the lithium-ion battery, in order to achieve the purpose of cooling. Liquid cooling is more uniform and the effect is obvious, especially in less space occupied, is more suitable for electric vehicles with lithium-ion battery pack system. However, at present, the design of liquid cooling system is complex, the design of fluid flow passage is not reasonable, heat-dissipation is not at the main heat-dissipation part of the battery pack. Although also the liquid cooling mode is used, but the actual effect is limited and cannot solve the heat-dissipation problem well.

A patent with application No. 201010619252.4, entitled "Liquid cooling device of power battery pack system" discloses a liquid-cooled apparatus using soft-package lithium-ion batteries as the power battery system, setting the heat transfer structure between the cells first, then they will be connected to form a battery module; then installing the multiple battery modules to the water-cooled base floor with circulating water channels, the outlet of the water-cooled base floor is connected with water pump, the pump is connected via the connecting pipe with an external heat-dissipation device; the inlet of the water-cooled base floor is connected with an external heat-dissipation device. Comparing to the traditional air-cooled technology, the technical solution of the present invention provided here improves cooling efficiency, but does not take full advantage of liquid cooling.

The technical solution here provides the heat transfer plate between the battery cells, the heat generated by the battery cells is exported to the base plate, then through the cooling system provided in the base plate for cooling, in theory, this can indeed achieve uniform heat-dissipation and heat-dissipation effect between the battery packs. But after tests it is found that, when the battery packs are used, the heat-generated parts of the individual are characteristic, not the overall heat production are similar, but concentrate on the tab around, the program aims at thermal conductivity on both sides of the battery cell, but the tab portions that the maximum heat produced are few, this cannot fully utilize the advantages of the liquid cooling. Particularly in extreme cases, the battery after over discharge, or overshoot, the heat capacity produced is great, the prior art technical solution does not solve the heat-dissipation requirements provided under these conditions.

SUMMARY OF THE INVENTION

The object of the present invention is to provide a liquid-cooled battery pack system, including the battery module, the battery case, the cooling insulating liquid, the circulating pump, the radiator and the liquid reservoir tank, the battery module is composed by a number of battery cells, the battery module and the cooling insulating liquid are disposed in the battery case, the battery module is immersed in the cooling insulating liquid, the one end of the battery pack is provided with the outlet of the cooling insulation liquid, the other end is provided with the inlet of the cooling insulating liquid, the inlet of the cooling insulating liquid, the reservoir tank, the radiator, the circulating pump and the outlet of the cooling insulating liquid are closed connection through pipelines, each ends of the battery module are provided with the fixed frame, the fixed frame are provided with blocking portions that hold the tabs of the battery cell, both ends of the fixed frame are provided with flow parts, the flow parts are provided with circulation passages and harness channels.

In a specific embodiment, the battery case is sealed by the components of a case with both ends open and a cover; the battery case can be made of stainless steel or aluminum alloy.

One end of the battery pack is provided with the outlet of the cooling insulation liquid, the other end is provided with the inlet of the cooling insulating liquid, so that the cooling insulating liquid can be recycled through the inside of battery case; the inlet of the cooling insulating liquid, the liquid reservoir tank, the radiator, the circulating pump and the outlet of the cooling insulating liquid are closed connection via pipelines, to form a closed cooling insulating circulation pipeline, after the effect of the circulating pump, the cooling insulation liquid, then flows in the pipeline, the heat radiator dissipates the heat brought out by the cooling insulation liquid out. In order to form a certain buffer between the cooling insulating fluid of the battery case and that of the circulating pipe, the reservoir tank is provided in the system, at the same time after the long-term use, to compensate the cooling insulating fluid reduced in the system in the use of process; the heat of the battery pack mainly be taken away by the cooling insulating fluid with high flow rate that flows through the circulation passage.

In a specific embodiment, the cooling insulating liquid is selected from one or both of the silicone oil, transformer oil, and fluorinated hydrocarbons.

Silicone oil has the excellent heat resistance, electrical insulation, hydrophobicity and high fire point properties, its density lower than the electrolyte, it is a liquid that immiscible with the electrolyte, it can improve the dielectric strength of the battery pack; even the sheet-like battery occurs breakage and leakage, the battery pack can still work normally, the transformer oil or the silicone oil can prevent the occurrence of side reactions of oxygen involved.

Transformer oil is a distillate product of the petroleum, its main components are hydrocarbons, naphthenic saturated hydrocarbons, aromatic unsaturated hydrocarbons and so on, commonly known as the square shed oil, the light yellow transparent liquid, the relative density is about 0.895, the flash point is ≥135° C., the freezing point is ←45° C., the main role of the transformer oil is insulating: transformer oil has a much higher dielectric strength than air, the insulating materials' immersing in the oil, not only the dielectric strength can be improved, but also against moisture erosion.

Compare to other liquid the silicone oil and transformer oil's more stable flame retardancy and insulating properties make these two materials becomes preferable materials.

In a specific embodiment, a separator is provided between the adjacent battery cells, the surface area of the separator is larger than the surface area of the battery cell.

According to one embodiment of the present invention, the separator is preferably made of the metal materials with better thermal conductivity. After the group design of the battery cell, in order to pursue the stability of the battery pack and the energy density of the battery pack the space between the battery cells is compressed as much as possible, it is easy to cause the heat-distribution uneven, setting separators with good thermal conductivity between the battery cells helps to evenly distribute the heat generated in the cell; during filling the cooling insulating liquid in the battery case, the battery pack with compact arrangement is also bad for the flow of the cooling insulating liquid, the separators can play the role in reserving the flow space, can also play the role in thermal conductivity, also pay a role in isolating the battery cell if a short circuit happens on it, to avoid affecting the normal operation of other cells.

In a specific embodiment, the separator is provide with concave and convex patterns, the concave and convex patterns distribute over the entire separator.

Setting the concave and convex pattern on the separator, is conducive to increase the surface area of the separator, increase the contact areas between the separator and the battery cell, enhance the heat-dissipation capability of the separator, it is better for the internal of the battery pack to get a more uniform temperature.

In a specific embodiment, the concave and convex patterns are selected from at least one of the diamond-shaped concave and convex patterns, square-shaped concave and convex patterns, triangle-shaped concave and convex patterns, strip-shaped concave and convex patterns, orange peel-shaped concave and convex patterns.

The concave and convex patterns are selected from at least one of the diamond-shaped concave square-shaped convex patterns, square-shaped concave and convex patterns, triangle-shaped concave and convex patterns, strip-shaped concave and convex patterns, orange peel-shaped concave and convex patterns, patterns extending from the bottom to the top of the separator, it is easy for the cooling insulating liquid to flow up and down along the concave and convex patterns, it is better for the uniform distribution of the temperature, and the improvement of the heat-dissipation effect.

In a specific embodiment, the extending direction of the circulation passage is parallel to the longitudinal direction of the battery pack, the depth of the circulation passage is equal to the thickness of the battery module, and the opening corresponding to the outlet of the cooling insulating liquid is closed.

The extending direction of the circulation passage is parallel to the longitudinal direction of the battery pack, it is facilitate for the arrangement of the battery pack, also for the achievement of the higher energy density, and because occurrence of the major part of the heat are tabs, so this design of circulation passage can take the heat of the tabs away directly, achieving better heat-dissipation effect; secondly, for the soft-package battery, the most prone to burst location is also the place around the tabs and the plastic film, once the battery cell occurs burst or combustion, the cooling insulating liquid in the circulation passage may extinguish the flame at the first time, to ensure the safety of the battery pack; setting the depth of the circulation passage equal to the thickness of the battery module, when combining the battery modules into the battery pack, the circulation passage corresponding to each battery module are just connected together to form a channel, it is more easy for the cooling insulating liquid to flow internal; setting the opening corresponding to the outlet of the cooling insulating liquid closed, so that the cooling insulating liquid can flow through the entire tabs, rather than the portion corresponding to the circulation passage.

In a specific embodiment, the circulation passage's the inner wall closed to the battery cell is provided with numbers of circulation holes.

The circulation passage's the inner wall closed to the battery cell is provided with numbers of circulation holes, after the cooling insulating fluid flows from the inlet into the battery case, flowing mainly through the circulation passage, and can also flow from the circulation holes to the batter cell, these enhance the heat dissipation, insulation and security.

In a specific embodiment, the fixed frames are provided with buffer rings between them, the buffer rings are sheathed on the battery cell.

Since this technical solution makes use of the soft-package battery cell, so the buffer rings are made of rubber, the buffer rings are sheathed on the battery cell, this can play a buffering effect on the battery cell, the buffer ring was sandwiched between two fixed frames, to ensure the position fixed during the operation, the following effects can be achieved, when the battery pack suffers impacts, these can effectively play the role of buffering; in the process of grouping battery cell, tightening the battery module, the soft-package battery cell is protected without extrusion.

In a specific embodiment, both end surfaces of the battery module are provided with cushion separately.

Expansion will occur in the battery pack during charging, setting cushions separately on both end surfaces of the battery module can play the role of buffering, to avoid accidents after the battery case bursts.

In a specific embodiment, the bottom of the fixed frame is provided with shunt grooves, the extending direction of the shunt grooves are in the same direction with the extending direction of the circulation passage.

Setting shunt grooves on the bottom of the fixed frame and the extending direction of the shunt grooves in the same direction with that of the circulation passage, these designs can reduce the resistance of the cooling insulating liquid when it flows in the battery case, it is good for increasing the flow rate; also for taking the heat of other parts of the battery cell away; for the convenience of the pressure of silicone oil to distribute under the bottom with the same pressure, isobaric, and also for the silicone oil flowing from the longitudinal direction to flow back into the battery case through these grooves.

For the concave and convex patterns being provided on the separator, there forms the flowing gap of the silicone oil between the patterns and the batter cell, the silicone oil flows from the bottom to the top at the longitudinal direction along the silicone oil passage provided by the separator, achieving the purpose of uniform heat-dissipation, making the temperature between the cells balanced.

In a specific embodiment, the outer wall of the case is provided with a plurality of longitudinal reinforcing ribs.

If using the aluminum alloy battery case, setting a plurality of longitudinal reinforcing ribs on the outer wall of the battery case can increase the strength of the battery case, strength compression and anti-distortion capability, also increase the surface area of the case, optimize the heat-dissipation performance.

If the case is made of stainless steel, it can meet the strength requirement without reinforcing ribs, and the connection between the case and the end plates can be welding, this can further reduce the volume and increase the volume efficiency.

In a specific embodiment, the outer surface of the case is provided with explosion-proof grooves, the notch depth of the explosion-proof groove is 20%~50% of the wall thickness of the case, in order to weaken the burst strength and form the security blasting port.

In a specific embodiment, the explosion-proof grooves include a U-type groove.

When an exception occurs in the internal battery pack, U-shaped grooves can break early to achieve the purpose of pressure relief before the pressure reaches the burst pressure of the case when volume's rapid expansion, and can guide the direction of the blast, so as to avoid more violent explosion occurrence for the excessive accumulation of internal pressure in the battery case, also to prevent the blast for the separation of the end plates and the case.

In a specific embodiment, the battery pack is provided with a temperature sensor.

Battery during normal operation, its parameters are stable, once a failure occurs, a battery cell of the battery pack may swell, the temperature rises sharply, the temperature sensor deposited in the battery pack can detect these changes, and preset comparison values in the temperature sensor, then a corresponding adjustment can be made based on the detection result of the temperature sensor, for example, disconnecting the battery pack from the power supply circuit or decreasing the discharge voltage of the battery pack.

In a specific embodiment, the temperature sensor is provided at the tabs of the battery module.

For the soft-package batteries, the largest part of heat-dissipation locates around the tabs, the temperature changes most is also this part, setting the temperature sensor around the tabs can discover the unusual occurrence of the battery cell at the beginning, after taking timely remedial measures, it can avoid the risk of proliferation, protect the safety of the battery pack, and avoid the dangers of passengers.

In a specific embodiment, the liquid reservoir tank is provided with a liquid level sensor.

After the soft-package battery's exception occurs, the gas produced will result in an increase in the internal pressure of the entire system, the cooling insulating liquid in the system will be pushed back to the liquid reservoir tank due to the increased pressure; setting the liquid level sensor in the liquid reservoir tank can monitor the level of the internal liquid in the liquid reservoir tank, the inside pressure of the system increases, thus deducing there is an exception in the battery cell of the battery case, processing these abnormal battery cells timely can avoid the deterioration of the situation.

In a specific embodiment, the liquid reservoir tank is provided with one-way oil-gas separation exhaust valve.

The liquid-cooled battery pack system is closed relative to the outside, the gas generated by the abnormal cells may flow into the liquid reservoir tank with the cooling insulating liquid, setting the one-way oil-gas separation exhaust valve on the liquid reservoir tank can exhaust the gas efficiently.

In a specific embodiment, the one-way oil-gas separation exhaust valve is sheathed with an airway.

When a battery cell in the battery pack causes gas leakage and leads to ruptures, the gas passes through the one-way oil-gas separation exhaust valve, the airway being sheathed on the one-way oil-gas separation exhaust valve can discharge the combustible gases under direction and control, thus avoiding the possible accidents.

In a specific embodiment, the liquid reservoir tank is provided with an electrolyte detector.

Setting electrolyte detector in the liquid reservoir tank for the detection of early situation of the damage occurring in the cell.

In a specific embodiment, the electrolyte detector includes a hydrofluoric acid detector.

After battery cell's leakage, hydrofluoric acid will be left in the cooling insulating liquid, so using the hydrofluoric acid detector can directly monitor whether the leakage of the battery cell occurs accurately.

In a specific embodiment, the case is provided with flexible connecting bars connected to the two covers.

Setting flexible connecting bars on the case, fixing the connecting bars' other end to the cover, and the two covers all connected to the case though the flexible connecting bars. When the voltage in the battery case is too large, U-shaped groove cannot completely guarantee the explosion's not occurrence, as to prevent the end plate blowing and hurting people, flexible connecting bars can firmly lock the end plate, even if the battery case explosion the end plate can be guaranteed not to blow and further enhance the safety performance of the battery pack.

After using the technical solution provided by the present invention, under the circumstance that the materials like electrode sheets, separator and so on are the same, the energy density of the battery pack is greatly increased; the cell and the current collector sheet are fully welded connections, these can cause less weld joints and not easy to produce desoldering, also ensure the stability of the battery cell tabs and high current carrying capacity, and avoid the use of wires when putting the parallel battery modules in series, reducing the volume of the battery pack; immersing with cooling insulating liquid and circulating cooling improve the thermal balance between the cells, the heat distribution in the battery pack is more uniform, the battery pack's insulation property is greatly improved, controlling the heat-dissipation capacity of the system by adjusting the flow rate of the circulating pump, not only the unnecessary energy consumption is avoided, but also the heat-dissipation capacity of the system is increased when needed; cell tab's double cycle design accelerates the heat-dissipation greatly of the high heat occurrence tab area, meanwhile significantly reduces the flow distance of the cooling insulating liquid, makes the cooling more fully and effectively; flow passage design at the bottom of the fixed frame makes the cooling liquid uniformly distribute in the bottom and then makes the flow smooth, and the buffer space is left for the shock suffering from the bottom of the battery pack; setting the rubber seal rings between the fixed frame makes the battery pack completely flexible contact with the outside, this helps preventing shock, and the outside of the cells is sealed to avoid the void bias flow of the cooling liquid.

Among them, 1, battery module, 11, battery cell, 12, fixed frame, 121, shunt groove, 13, circulation part, 131, circulation passage, 132, harness channels, 133, circulation hole, 14, buffer ring, 15, temperature sensor, 16, sealing sheet, 2, current collector sheet, 21, copper sheet, 22, aluminum sheet, 23, welding groove, 3, battery case, 31, the inlet of the cooling insulting liquid, 32, the outlet of the cooling insulting liquid, 33, reinforcing rib, 34, case, 35, cover, 36, flexible connecting bar, 37, U-type groove, 4, circulation pump, 5, radiator, 6, liquid reservoir tank, 61, liquid level sensor.

DETAILED DESCRIPTION OF EMBODIMENTS OF THE INVENTION

Example 1

Figure 1:
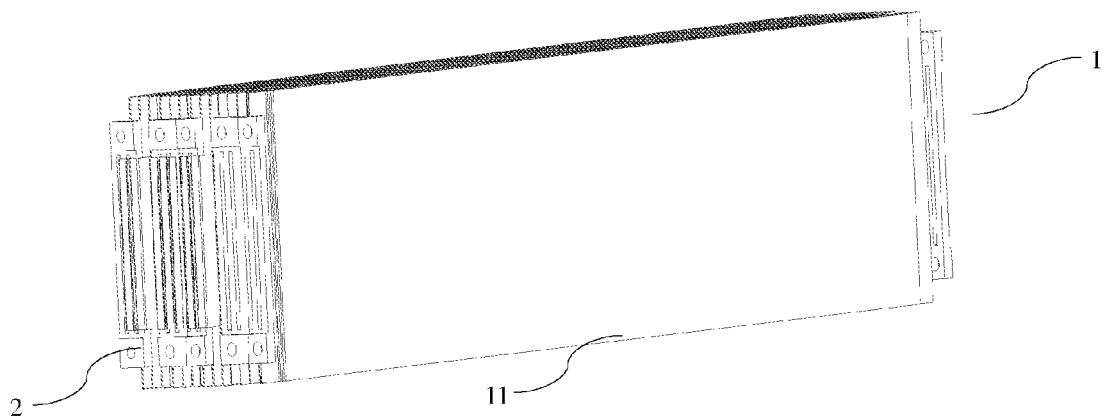
FIG. 1 shows the scheme of the battery module of one embodiment of the present invention.
Figure 2:
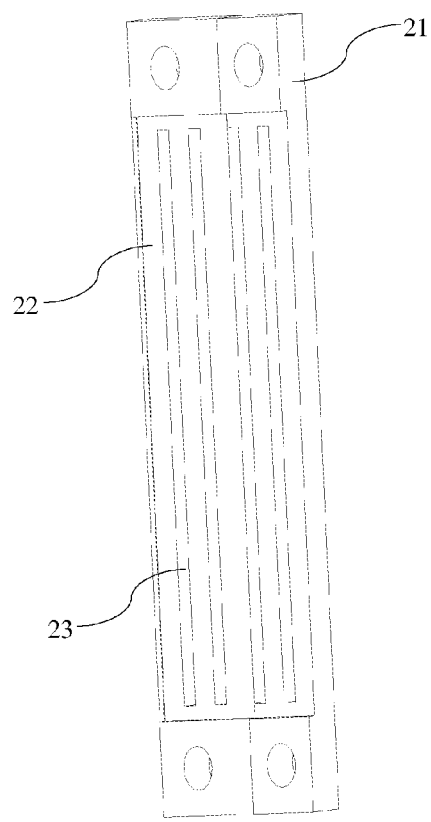
FIG. 2 shows the scheme of the current collector sheet of the battery module of one embodiment of the present invention.

As shown in FIG. 1 to FIG. 2, the present embodiment provides a cell module 1, comprising a battery cell 11 and a current collector sheet 2, the battery cell 11 is provided with a positive electrode tab and a negative electrode tab, the positive electrode tab and the negative electrode tab are located at the opposite ends of the battery cell 11, the positive electrode tab of the battery cell 11 is a aluminum foil tab, the negative electrode tab is a copper foil tab, the current collector sheet 2 is a combined current collector sheet, the current collector sheet 2 is combined by the aluminum sheet 22 and the copper sheet 21, the aluminum sheet 22 and the copper sheet 21 are fixed by riveting, the aluminum sheet 22 and the copper sheet 21 are respectively provided with a welding groove 23.

In the process of assembling the battery module 1, the battery cell 11 is connected in parallel first, welding the aluminum foil tab of the battery cell 11 that needs to be connected in parallel to the welding groove 23 of the aluminum sheet 22, welding the copper foil tab to the welding groove 23 of the copper sheet 21, then welding copper foil tab of the battery cell 11 that needs to be connected in series to the welding groove 23 of the copper sheet 21 of the positive current collector sheet of a battery module 1, welding the aluminum foil tab to the welding groove 23 of the aluminum sheet 22 of the positive current collector sheet of battery module 1.

The advantage of this embodiment is the ultra-high energy density and the stability of the battery pack structure; the length of the battery pack in present embodiment is 14 dm, the width is 4.3 dm, the height is 1 dm, and the battery pack is composed of 3 in parallel, 96 clusters of battery cells, the length of the electrode sheet is 3.6 dm, the width is 0.8 dm, the thickness is 0.036 dm, the capacity of the battery case 3 is 14*4.3*1=60 L, the volume of all the electrode sheets in a battery case is 3.6*0.8*0.036*3*96=30 L, so the EVR is 30/60=50%, is much larger than the EVR of only 25.2% of the battery pack that the Tesla used in the background art, in the premise that the materials of the electrode and separator are completely consistent, the battery energy density is greatly improved.

Example 2

Figure 3:
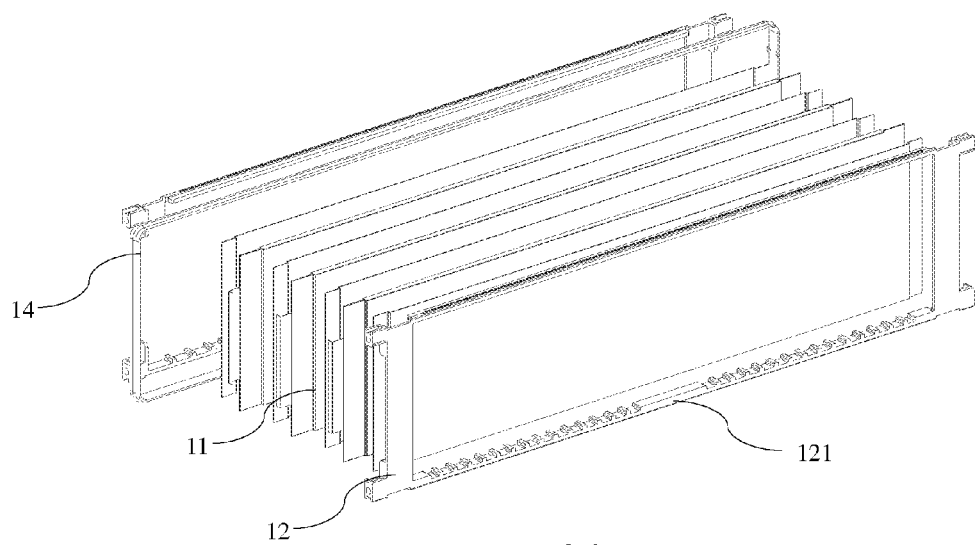
FIG. 3 shows the scheme of the battery module of another embodiment of the present invention.
Figure 4:
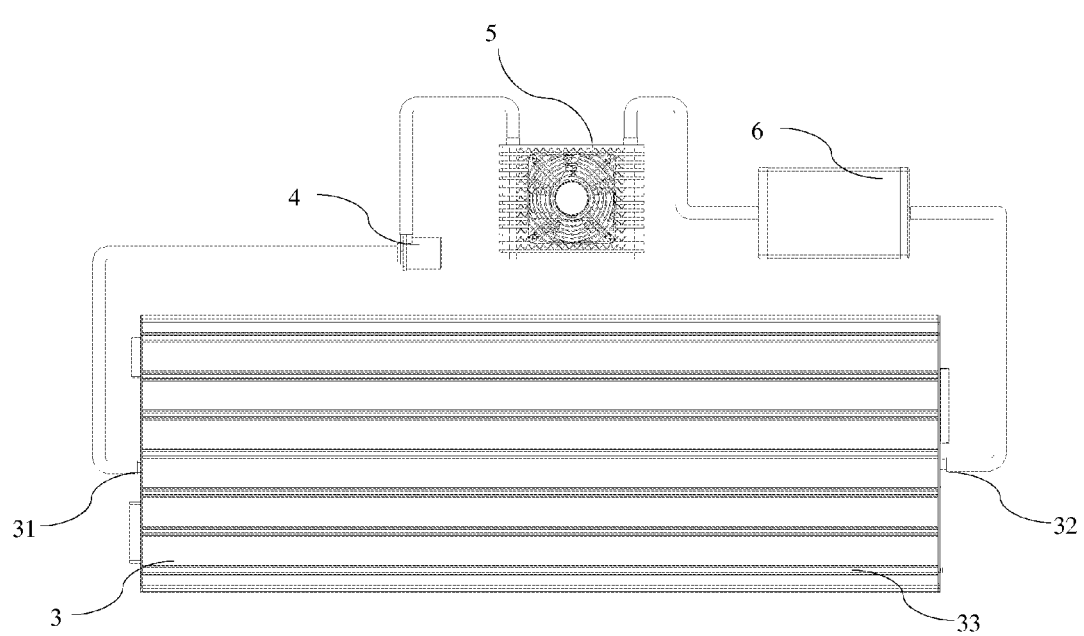
FIG. 4 shows the scheme of the liquid-cooled battery system of one embodiment of the present invention.
Figure 5:
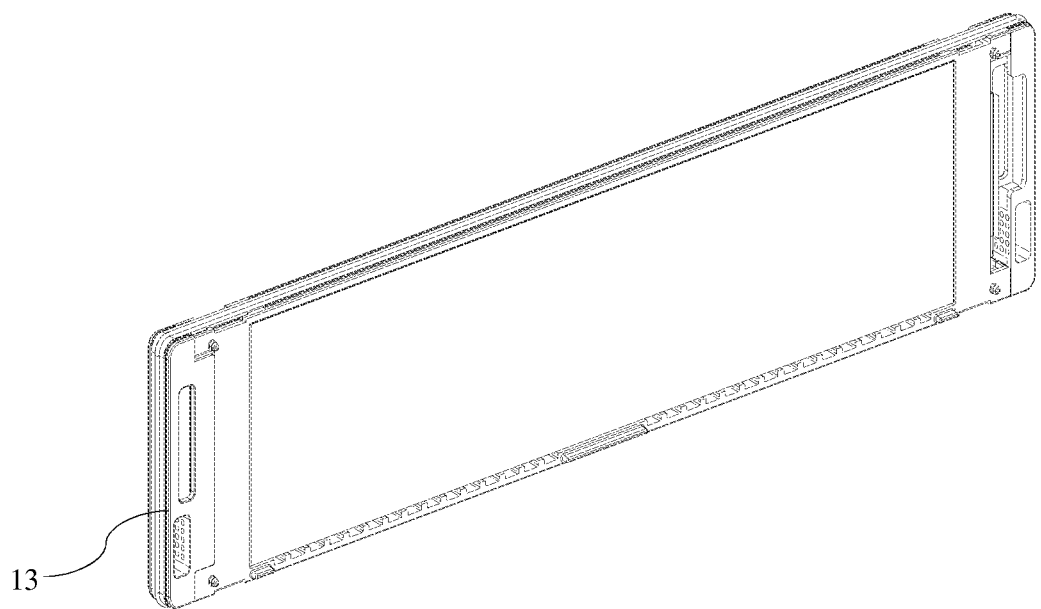
FIG. 5 shows the scheme of the battery module of the third embodiment of the present invention.
Figure 6:
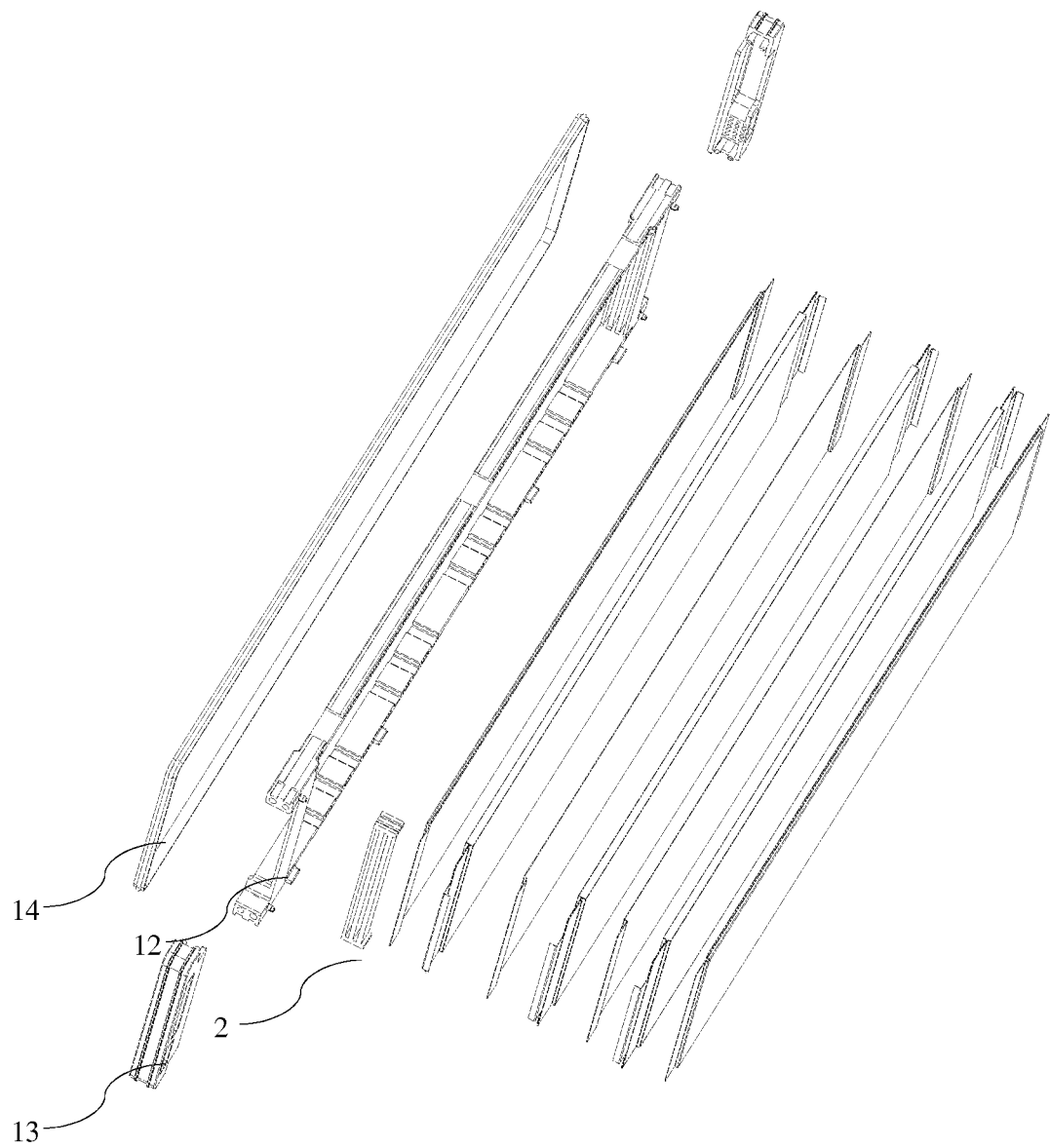
FIG. 6 shows the exploded diagram of the battery module of the third embodiment of the present invention.
Figure 7:
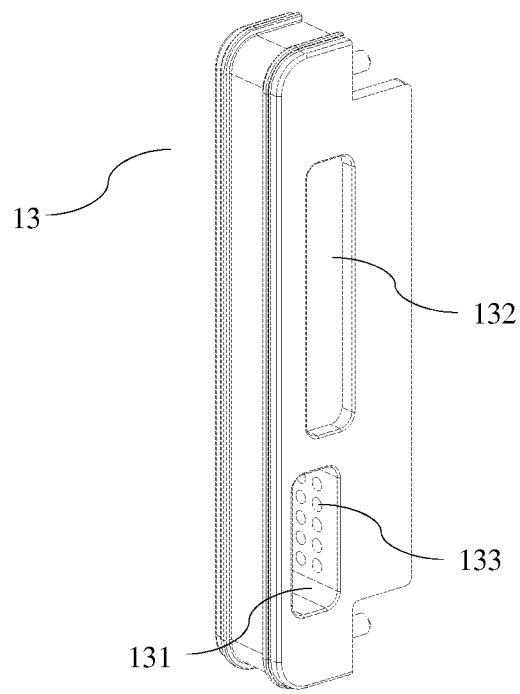
FIG. 7 shows the scheme of the circulation part of one embodiment of the present invention
Figure 8:
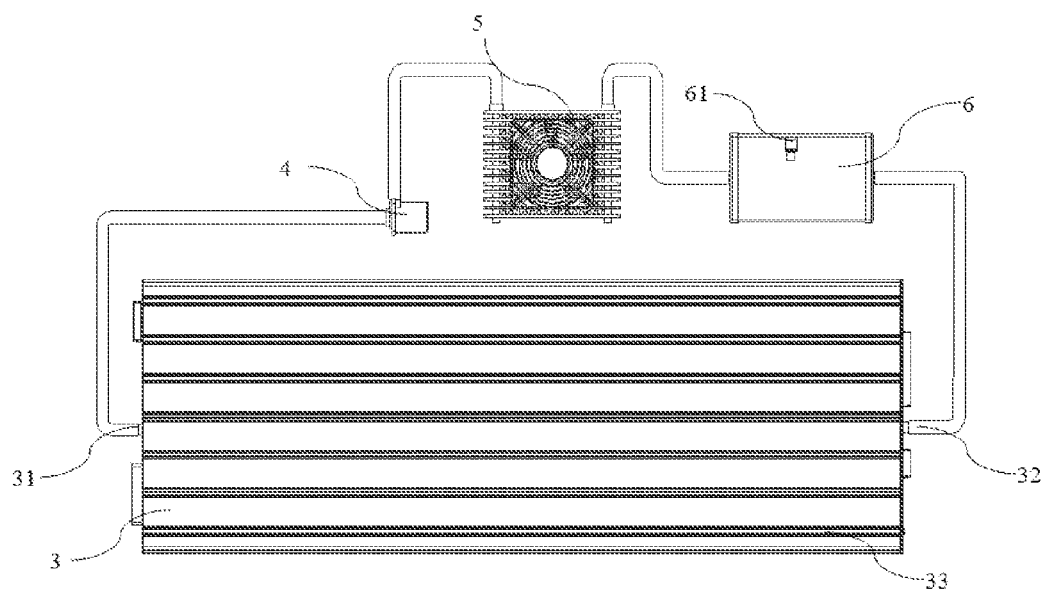
FIG. 8 shows the scheme of the liquid-cooled battery system of another embodiment of the present invention.
Figure 9:
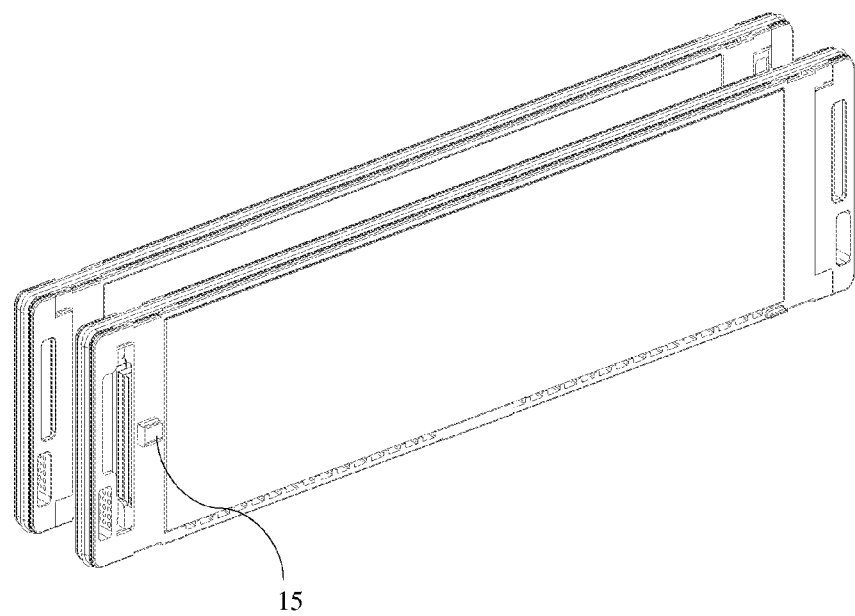
FIG. 9 shows the scheme of the battery module of the fourth embodiment of the present invention.
Figure 10:
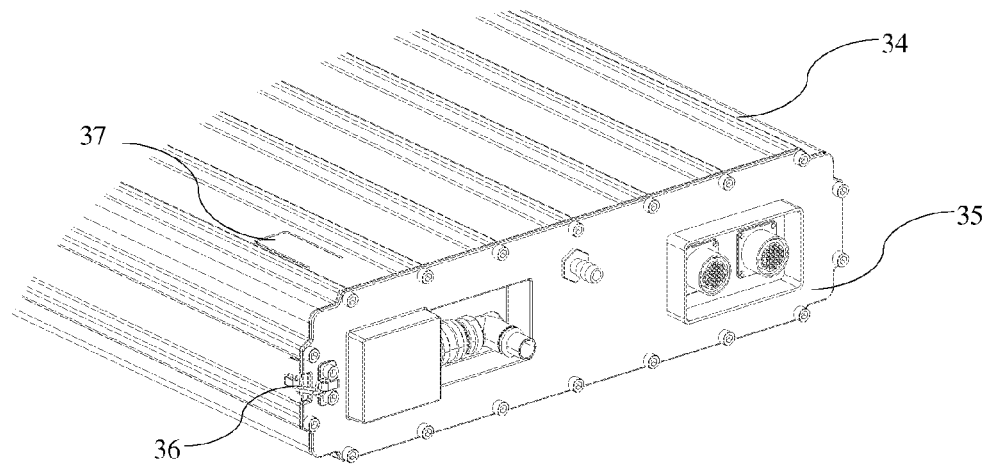
FIG. 10 shows the scheme of the battery case of one embodiment of the present invention.
Figure 11:
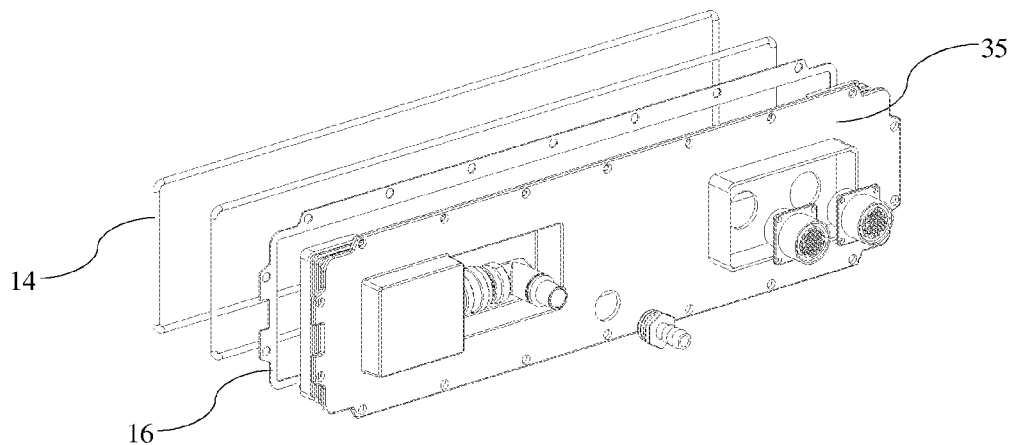
FIG. 11 shows the exploded diagram of the battery case of one embodiment of the present invention.

As shown in FIGS. 1 to 3, the present embodiment provides a cell module 1, comprising a battery cell 11 and a current collector sheet 2, the battery cell 11 is provided with a positive tab and the negative tab, the positive tab and the negative tab are located at the opposite ends of the battery cell 11, the positive tab of the battery cell 11 is a aluminum foil tab, the negative electrode tab is a copper foil tab, the current collector sheet 2 is a combined collector sheet, the current collector sheet is the combination of the aluminum sheet 22 and the copper sheet 21, the aluminum 22 and the copper sheet 21 are fixed by riveting, the aluminum sheet 22 and the copper sheet 21 are respectively provided with the welding grooves 23.

In the process of assembling the battery module 1, the battery cell 11 is connected in parallel first, welding the aluminum foil tab of the battery cell 11 that needs to be connected in parallel to the welding groove 23 of the aluminum sheet 22, welding the copper foil tab to the welding groove 23 of the copper sheet 21, then welding copper foil tab of the battery cell 11 that needs to be connected in series to the welding groove 23 of the copper sheet 21 of the positive current collector sheet of a battery module 1, welding the aluminum foil tab to the welding groove 23 of the aluminum sheet 22 of the positive current collector sheet of a battery module 1.

Both ends of the battery module 1 are provided with a fixed frame 12, the battery cell is hold in the middle of the two fixed frames 12, and setting the buffer ring 14 between the fixed frames 12, the fixed frame 12 is provided with blocking portions that hold the tab of the battery cell, both ends of the fixed frame are provided with cushions.

The advantage of this embodiment is that under a higher energy density ensured, the design of the buffer structure makes the battery pack with a certain degree of shock-proof and impact-resistance ability.

Example 3

As shown in FIGS. 1 to 2, FIGS. 4 to 7 and FIG. 11, the present embodiment provides a liquid-cooled battery back system, including a battery module 1, a battery case 3, the cooling insulating liquid, a circulating pump 4, a radiator 5 and a liquid reservoir tank 6, the battery case 3 is sealed by the components of a case 34 with both ends open and a cover 35, a buffer ring 14 and a sealing sheet 16 is set between the case 34 and the cover 35, the battery module 1 and the cooling insulating liquid are disposed in the battery case 3, the battery module 1 is immersed in the cooling insulating liquid, the one end of the battery pack is provided with an outlet of the cooling insulation liquid 32, the other end is provided with an inlet of the cooling insulating liquid 31, the inlet of the cooling insulating liquid 31, the circulating pump 4, the radiator 5, the reservoir tank 6 and the outlet of the cooling insulating liquid 32 are closed connection through pipelines, the outside wall of the case 34 is provided with a plurality of longitudinal reinforcing ribs 33, the cooling insulating liquid is the silicone oil in this implement.

The battery module 1 includes a battery cell 11 and a current collector sheet 2, the battery cell 11 is provided with a positive tab and a negative tab, the positive tab and the negative tab are located at the opposite ends of the battery cell 11, the positive tab of the battery cell 11 is a aluminum foil tab, the negative electrode tab is a copper foil tab, the current collector sheet 2 is a combined collector sheet, the current collector sheet 2 is the combination of the aluminum sheet 22 and the copper sheet 21, the aluminum 22 and the copper sheet 21 are fixed by riveting, the aluminum sheet 22 and the copper sheet 21 are respectively provided with the welding grooves 23.

In the process of assembling the battery module 1, the battery cell 11 is connected in parallel first, welding the aluminum foil tab of the battery cell 11 that needs to be connected in parallel to the welding groove 23 of the aluminum sheet 22, welding the copper foil tab to the welding groove 23 of the copper sheet 21, then welding copper foil tab of the battery cell 11 that needs to be connected in series to the welding groove 23 of the copper sheet 21 of the positive current collector sheet of a battery module 1, welding the aluminum foil tab to the welding groove 23 of the aluminum sheet 22 of the positive current collector sheet of a battery module 1.

Between each two adjacent battery cell of the battery module 1 is provided with aluminum separators, the two sides of the two ends of the battery cell are also provided with separators, the separator is pressed out with concave and convex patterns, and they are distributed on the whole separator uniformly, the diamond-shaped concave and convex patterns, the square-shaped concave and convex patterns, triangle-shaped concave and convex patterns, strip-shaped concave and convex patterns distribute across the separator, and others that can form concave and convex patterns on the separator, the position of the tabs on both ends of the battery module 1 are provided with a circulation part 13, the circulation part 13 is provided with a circulation passage 131 and a harness channel 132, the sample line that leads from the battery module 1 goes through the harness channel 132, the extending direction of the circulation passage 131 is parallel to the longitudinal direction of the battery pack, the depth of the circulation passage 131 is equal to the thickness of the battery module 1, and the inner wall close to the battery cell is provided with numbers of circulation holes 133, after the battery modules 1 being grouped into the battery pack, the circulation passage 131 of each battery module 1 are connected together, to form an integral passage, it is better for the flow of the silicone oil.

The advantage of this embodiment is that circulation passage of the cooling insulating liquid is rationally designed in the battery case 3, this design reduces the bias flow of the cooling insulating liquid, makes the flow more smoothly, and the heat-dissipation better.

Example 4

As shown in FIGS. 1 to 2, FIGS. 5 to 11, the present embodiment provides a liquid-cooled battery pack system, including a battery module 1, a battery case 3, the cooling insulating liquid, a circulating pump 4, a radiator 5 and a liquid reservoir tank 6, the battery case 3 is sealed by the components of a case 34 with both ends open and a cover 35, a buffer ring 14 and a sealing sheet 16 is set between the case 34 and the cover 35, the battery module 1 and the cooling insulating liquid are disposed in the battery case 3, the battery module 1 is immersed in the cooling insulating liquid, the one end of the battery pack is provided with an outlet of the cooling insulation liquid 32, the other end is provided with an inlet of the cooling insulating liquid 31, the inlet of the cooling insulating liquid 31, the circulating pump 4, the radiator 5, the reservoir tank 6 and the outlet of the cooling insulating liquid 32 are closed connection through pipelines, the outside wall of the case 34 is provided with a plurality of longitudinal reinforcing ribs 33, the outer surface of the case 34 is also provided with a U-shaped groove 37, the depth of the U-shaped groove 37 is half the wall thickness of the case 34, the case 34 is provided with two flexible connecting bars 36 which are connected to the two covers 35, the cooling insulating liquid in this implement is silicone oil.

The battery module 1 includes a battery cell 11 and a current collector sheet 2, the battery cell 11 is provided with a positive electrode tab and a negative electrode tab, the positive electrode tab and the negative electrode tab are located at the opposite ends of the battery cell 11, the positive electrode tab of the battery cell 11 is a aluminum foil tab, the negative electrode tab is a copper foil tab, the current collector sheet 2 is a combined current collector sheet, the current collector sheet 2 is combined by the aluminum sheet 22 and the copper sheet 21, the aluminum sheet 22 and the copper sheet 21 are fixed by riveting, the aluminum sheet 22 and the copper sheet 21 are respectively provided with a welding groove 23.

In the process of assembling the battery module 1, the battery cell 11 is connected in parallel first, welding the aluminum foil tab of the battery cell 11 that needs to be connected in parallel to the welding groove 23 of the aluminum sheet 22, welding the copper foil tab to the welding groove 23 of the copper sheet 21, then welding copper foil tab of the battery cell 11 that needs to be connected in series to the welding groove 23 of the copper sheet 21 of the positive current collector sheet of a battery module 1, welding the aluminum foil tab to the welding groove 23 of the aluminum sheet 22 of the positive current collector sheet of a battery module 1.

Between each two adjacent battery cell the battery module 1 is provided with aluminum separators, the two sides of the two ends of the battery cell are also provided with separators, the separator is pressed out with concave and convex patterns, and they are distributed on the whole the separator uniformly, the diamond-shaped concave and convex patterns, the square-shaped concave and convex patterns, triangle-shaped concave and convex patterns, strip-shaped concave and convex patterns distribute across the separator, and others that can form concave and convex patterns on the separator, the positions of tabs on both ends of the battery module 1 are provided with a circulation part 13, the circulation part 13 are provided with a circulation passage 131 and a harness channel 132, the sample line that leads from the battery module 1 goes through the harness channel 132, the extending direction of the circulation passage 131 is parallel to the longitudinal direction of the battery pack, the depth of the circulation passage 131 is equal to the thickness of the battery module 1, and the inner wall close to the battery cell is provided with numbers of circulation holes 133, after the battery modules 1 being grouped into the battery pack, the circulation passage 131 of each battery module 1 are connected together, to form an integral passage, and the opening end corresponding to the outlet of the cooling insulated liquid will be closed.

The top of the battery case 34 is provided with a one-way oil-gas separation exhaust valve, the liquid reservoir tank 6 is provided with a liquid level sensor 61, the top of the liquid reservoir tank is provided with a one-way oil-gas separation exhaust valve, the one-way oil-gas separation exhaust valve is sheathed with an airway, the liquid reservoir tank is also provided with a hydrofluoric acid detector, the battery pack case 34 is provided with a one-way valve; further in the battery pack there is provided with a temperature sensor 15, the temperature sensor 15 is deposited around the tab of the battery module 1, when an exception occurs in the battery pack, the temperature sensor 15 will monitor the abnormalities of the parameters of the battery cell, and give warning to the driver.

The advantage of this embodiment is that the circulation passage of the cooling insulating liquid is rationally designed in battery case 3, reducing the bias flow of the cooling insulating liquid, making it flow more smoothly, getting better heat-dissipation effect; meanwhile the security of the entire system is designed, the explosion-proof structure, the risk monitoring, gas release and alarm functions are added.

Example 5

As shown in FIGS. 1 to 6, and FIG. 11, the present embodiment provides a liquid-cooled battery system, including a battery module 1, a battery case 3, the cooling insulating liquid, a circulating pump 4, a radiator 5 and a liquid reservoir tank 6. The battery case 3 is sealed by the components of a case 34 with both ends open and a cover 35. A buffer ring 14 and a sealing sheet 16 are set between the case 34 and the cover 35. The battery module 1 and the cooling insulating liquid are disposed in the battery case 3. The battery module 1 is immersed in the cooling insulating liquid. The one end of the battery pack is provided with an outlet of the cooling insulation liquid 32. The other end is provided with an inlet of the cooling insulating liquid 31. The inlet of the cooling insulating liquid 31, the circulating pump 4, the radiator 5, the reservoir tank 6 and the outlet of the cooling insulating liquid 32 are closed connection through pipelines. The outside wall of the case 34 is provided with a plurality of longitudinal reinforcing ribs 33. the cooling insulating liquid in this implement is silicone oil.

The battery module 1 includes a battery cell 11 and a current collector sheet 2. the battery cell 11 is provided with a positive electrode tab and a negative electrode tab. the positive electrode tab and the negative electrode tab are located at the opposite ends of the battery cell 11. The positive electrode tab of the battery cell 11 is an aluminum foil tab. the negative electrode tab is a copper foil tab. the current collector sheet 2 is a combined current collector sheet. The current collector sheet 2 is combined by the aluminum sheet 22 and the copper sheet 21. The aluminum sheet 22 and the copper sheet 21 are fixed by riveting. the aluminum sheet 22 and the copper sheet 21 are respectively provided with a welding groove 23.

In the process of assembling the battery module 1, the battery cell 11 is connected in parallel first. Subsequently the process continues as follows: welding the aluminum foil tab of the battery cell 11 needs to be connected in parallel to the welding groove 23 of the aluminum sheet 22, welding the copper foil tab to the welding groove 23 of the copper sheet 21, then welding copper foil tab of the battery cell 11 that needs to be connected in series to the welding groove 23 of the copper sheet 21 of the positive current collector sheet of a battery module 1, welding the aluminum foil tab to the welding groove 23 of the aluminum sheet 22 of the positive current collector sheet of a battery module 1.

Between each two adjacent battery cell the battery module 1 is provided with aluminum separators. The two sides of the two ends of the battery cell are also provided with separators. The separator is pressed out with concave and convex patterns, and they are distributed on the whole of the separator uniformly. The diamond-shaped concave and convex patterns, the square-shaped concave and convex patterns, triangle-shaped concave and convex patterns, strip-shaped concave and convex patterns distribute across the separator, and others can form concave and convex patterns on the separator. The ends of the battery module 1 are provided with fixed frame 12. The battery cell is hold in the middle of the two fixed frames 12, and setting the buffer ring 14 between the fixed frames 12. Both ends of the fixed frame are provided with cushions. the fixed frame 12 is provided with blocking portions that hold the tab of the battery cell. Both ends of the battery module 1 are provided with a circulation part 13. Both ends of the fixed frame 12 are provided with a circulation part 13. The bottom of the fixed frame 12 is provided with a shunt groove 121. The extending direction of the shunt groove is parallel to the extending direction of the circulation passage 131. The circulation part 13 is provided with a circulation passage 131 the circulation and a harness channel 132. the sample line that leads from the battery module 1 goes through the harness channel 132. the extending direction of the circulation passage 131 is parallel to the longitudinal direction of the battery pack. The depth of the circulation passage 131 is equal to the thickness of the battery module 1, and the opening corresponding to the outlet of the cooling insulting liquid is closed. After the battery modules 1 are grouped into the battery pack, the circulation passage 131 of each battery module 1 are connected together, to form an integral passage, to facilitate the circulation of silicone oil.

The advantage of this embodiment is that the circulation passage of the cooling insulating liquid is rationally designed in battery case 3, reducing the bias flow of the cooling insulating liquid, making it flow more smoothly, getting better heat-dissipation effect; meanwhile the design of buffer structure makes the battery with a certain degree of shock-proof and impact-resist ability.

Example 6

As shown in FIGS. 1 to 3, and FIG. 5 toll, the present embodiment provides a liquid-cooled battery system, including a battery module 1, a battery case 3, the cooling insulating liquid, a circulating pump 4, a radiator 5, and a liquid reservoir tank 6. the battery case 3 is sealed by the components of a case 34 with both ends open and a cover 35. A buffer ring 14 and a sealing sheet 16 is set between the case 34 and the cover 35. The battery module 1 and the cooling insulating liquid are disposed in the battery case 3. The battery module 1 is immersed in the cooling insulating liquid, the one end of the battery pack is provided with an outlet of the cooling insulation liquid 32, and the other end is provided with an inlet of the cooling insulating liquid 31. The inlet of the cooling insulating liquid 31, the circulating pump 4, the radiator 5, the reservoir tank 6 and the outlet of the cooling insulating liquid 32 are formed via closed connection through pipelines. The outside wall of the case 34 is provided with a plurality of longitudinal reinforcing ribs 33. the cooling insulating liquid in this implement is silicone oil.

The battery module 1 includes a battery cell 11 and a current collector sheet 2, the battery cell 11 is provided with a positive electrode tab and a negative electrode tab, the positive electrode tab and the negative electrode tab are located at the opposite ends of the battery cell 11, the positive electrode tab of the battery cell 11 is an aluminum foil tab, the negative electrode tab is a copper foil tab, the current collector sheet 2 is a combined current collector sheet, the current collector sheet 2 is combined by the aluminum sheet 22 and the copper sheet 21, the aluminum sheet 22 and the copper sheet 21 are fixed by riveting, the aluminum sheet 22 and the copper sheet 21 are respectively provided with a welding groove 23.

In the process of assembling the battery module 1, the battery cell 11 is connected in parallel first, welding the aluminum foil tab of the battery cell 11 that needs to be connected in parallel to the welding groove 23 of the aluminum sheet 22, welding the copper foil tab to the welding groove 23 of the copper sheet 21, then welding copper foil tab of the battery cell 11 that needs to be connected in series to the welding groove 23 of the copper sheet 21 of the positive current collector sheet of a battery module 1, welding the aluminum foil tab to the welding groove 23 of the aluminum sheet 22 of the positive current collector sheet of a battery module 1.

Between each two adjacent battery cells the battery module 1 is provided with aluminum separators, the two sides of the two ends of the battery cell are also provided with separators. the separator is pressed out with concave and convex patterns, and they are distributed on the whole separator uniformly. The diamond-shaped concave and convex patterns, the square-shaped concave and convex patterns, triangle-shaped concave and convex patterns, strip-shaped concave and convex patterns distribute across the separator, and others that can form concave and convex patterns on the separator. the ends of the battery module 1 are provided with fixed frame 12. The battery cell is hold in the middle of the two fixed frames 12, and setting the buffer ring 14 between the fixed frames 12, both ends of the fixed frame are provided with cushions. The fixed frame 12 is provided with blocking portions that hold the tab of the battery cell. Both ends of the battery module 1 are provided with a circulation part 13. The bottom of the fixed frame 12 is provided with a shunt groove 121. The extending direction of the shunt groove is parallel to the circulation passage 131. The circulation part 13 is provided with a circulation passage 131, and the circulation and a harness channel 132. The sample line leads from the battery module 1 goes through the harness channel 132, the extending direction of the circulation passage 131 is parallel to the longitudinal direction of the battery pack. The depth of the circulation passage 131 is equal to the thickness of the battery module 1, and the opening corresponding to the outlet of the cooling insulting liquid is closed, and the inner wall close to the battery cell is provided with number of circulation holes 133. After the battery modules 1 being grouped into battery pack, the circulation passage 131 of each battery module 1 are connected together, to form an integral passage, to facilitate the circulation of silicone oil.

The top of the battery case 34 is provided with a one-way oil-gas separation exhaust valve, the liquid reservoir tank 6 is provided with the liquid level sensor. The liquid reservoir tank is provided with a one-way oil-gas separation exhaust valve. The one-way oil-gas separation exhaust valve is sheathed with an airway. The liquid reservoir tank is also provided with a hydrofluoric acid detector. The battery pack case 34 is provided with a one-way valve. Further in the battery pack there is provided with a temperature sensor 15. The temperature sensor 15 is provided around the tab of the battery module 1. When an exception occurs in the battery pack, the temperature sensor 15 will monitor the abnormalities of the parameters of the battery cell, and give a warning to the driver. The outer surface of the case 34 is also provided with a U-shaped groove 37. the depth of the U-shaped groove 37 is half the wall thickness of the case 34, the case 34 is provided with two flexible connecting bars 36 which are connected to the two covers 35.

The advantage of this embodiment is that the circulation passage of the cooling insulating liquid is rationally designed in battery case 3, reducing the bias flow of the cooling insulating liquid, making it flow more smoothly, getting better heat-dissipation effect; meanwhile the security of the entire system is designed, the explosion-proof structure, the risk monitoring, gas release and alarm functions are added.

What is claimed is:

1. A liquid-cooled battery pack system, comprising:
   a battery module;
   a battery case;
   a cooling insulating liquid;
   a circulating pump, a radiator; and
   a liquid reservoir tank;
   the battery module having a plurality of battery cells, the battery module and the cooling insulating liquid being disposed in the battery case, the battery module being immersed in the cooling insulating liquid, a first end of the battery pack being provided with an outlet of the cooling insulation liquid, a second end being provided with an inlet of the cooling insulating liquid; and
   the inlet of the cooling insulating liquid, the reservoir tank, the radiator, the circulating pump and the outlet of the cooling insulating liquid being closed connection through pipelines, either side of the battery module parallel to the battery cells therein being provided with a fixed frame, a blocking portion extending outwardly from either end of each fixed frame, opposite blocking portions at the same end holding corresponding cell tabs of the battery cells sandwiched therein, either end of the fixed frames being provided with a flow part matching with corresponding blocking portion, each flow part being provided with a circulation passage and a harness channel; and
   an extending direction of the circulation passages is parallel to a longitudinal direction of the battery pack.

2. The liquid-cooled battery pack system of claim 1, wherein the battery case is sealed and assembled by components comprising a case and two covers, both ends of the case are open.

3. The liquid-cooled battery pack system of claim 1, wherein the cooling insulating liquid is selected from one or two of the groups consisting of silicone oil, transformer oil, and fluorinated hydrocarbons.

4. The liquid-cooled battery pack system of claim 1, wherein a separator is provided at either side of each battery cell, a surface area of the separator is larger than that of its adjacent battery cell.

5. The liquid-cooled battery pack system of claim 4, wherein the separator is provided with concave and convex patterns, the concave and convex patterns distribute over the entire separator.

6. The liquid-cooled battery pack system of claim 5, wherein the concave and convex patterns are selected from at least one of the diamond-shaped concave and convex patterns, square-shaped concave and convex patterns, triangle-shaped concave and convex patterns, strip-shaped concave and convex patterns, or orange peel-shaped concave and convex patterns.

7. The liquid-cooled battery pack system of claim 1, wherein:
   a depth of the circulation passages is equal to the thickness of the battery module, and an opening corresponding to the outlet of the cooling insulating liquid is closed.

8. The liquid-cooled battery pack system of claim 7, wherein inner wall of each circulation passage, closed to the battery cell, is provided with a plurality of circulation holes.

9. The liquid-cooled battery pack system of claim 1, wherein the fixed frames are provided with buffer rings between them, the buffer rings are sheathed on the battery cells between the fixed frames.

10. The liquid-cooled battery pack system of claim 9, wherein both end surfaces of the battery module are provided with cushion separately.

11. The liquid-cooled battery pack system of claim 1, wherein the bottom of the fixed frame is provided with shunt grooves, an extending direction of the shunt grooves is in the same direction with that of the circulation passages.

12. The liquid-cooled battery pack system of claim 1, wherein an outer wall of the case is provided with a plurality of longitudinal reinforcing ribs.

13. The liquid-cooled battery pack system of claim 1, wherein an outer surface of the case is provided with explosion-proof grooves, a notch depth of the explosion-proof grooves is 20%-50% of the wall thickness of the case.

14. The liquid-cooled battery pack system of claim 13, wherein the explosion-proof grooves include a U-shaped groove.

15. The liquid-cooled battery pack system of claim 14, wherein the battery pack is provided with a temperature sensor.

16. The liquid-cooled battery pack system of claim 15, wherein the temperature sensor is provided at the cell tabs of the battery module.

17. The liquid-cooled battery pack system of claim 15, wherein the liquid reservoir tank is provided with a liquid level sensor.

18. The liquid-cooled battery pack system of claim 17, wherein the liquid reservoir tank is provided with a one-way oil-gas separation exhaust valve.

19. The liquid-cooled battery pack system of claim 18, wherein the one-way oil-gas separation exhaust valve is sheathed with an airway.

20. The liquid-cooled battery pack system of claim 19, wherein the liquid reservoir tank is provided with an electrolyte detector.

21. The liquid-cooled battery pack system of claim 20, wherein the electrolyte detector includes a hydrofluoric acid detector.

22. The liquid-cooled battery pack system of claim 2, wherein the case is provided with flexible connecting bars connected to the two covers.

23. The liquid-cooled battery pack system of claim 10, wherein an outer wall of the case is provided with a plurality of longitudinal reinforcing ribs.

24. A liquid-cooled battery pack system, comprising:
a battery module;
a battery case;
a cooling insulating liquid;
a circulating pump, a radiator; and
a liquid reservoir tank;
the battery module having a plurality of battery cells, the battery module and the cooling insulating liquid being disposed in the battery case, the battery module being immersed in the cooling insulating liquid, a first end of the battery pack being provided with an outlet of the cooling insulation liquid, a second end being provided with an inlet of the cooling insulating liquid; and
the inlet of the cooling insulating liquid, the reservoir tank, the radiator, the circulating pump and the outlet of the cooling insulating liquid being closed connection through pipelines, either side of the battery module parallel to the battery cells therein being provided with a fixed frame, a blocking portion extending outwardly from either end of each fixed frame, opposite blocking portions at the same end holding corresponding cell tabs of the battery cells sandwiched therein, either end of the fixed frames being provided with a flow part matching with corresponding blocking portion, each flow part being provided with a circulation passage and a harness channel;
an extending direction of the circulation passages is parallel to a longitudinal direction of the battery pack; and
a material of the battery case is selected from the group consisting of stainless steel or aluminum alloy.

* * * * *